June 19, 1962  W. LEHMANN  3,040,202
ELECTROLUMINESCENT CELL AND METHOD
Filed July 3, 1958  2 Sheets-Sheet 1
FIG. 1.
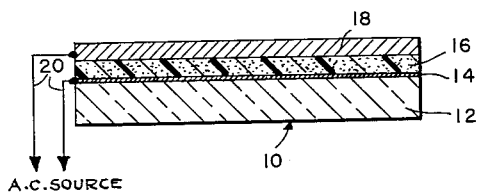
FIG. 2.
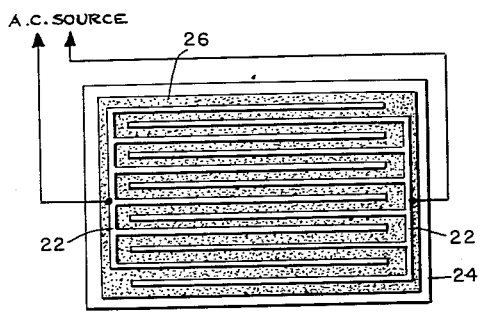
FIG. 3.
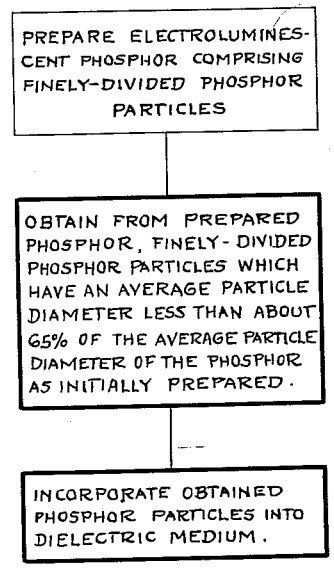
FIG. 4.
FIG. 5.
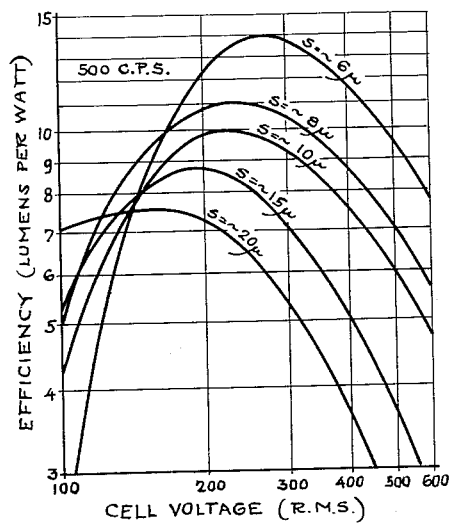
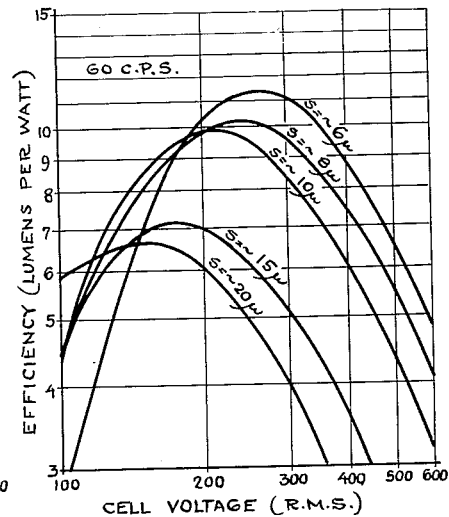
INVENTOR.
WILLI LEHMANN.
BY W. D. Palmer
ATTORNEY.

United States Patent Office 3,040,202
Patented June 19, 1962

3,040,202
ELECTROLUMINESCENT CELL AND METHOD
Willi Lehmann, Livingston, N.J., assignor to Westinghouse Electric Corporation, East Pittsburgh, Pa., a corporation of Pennsylvania
Filed July 3, 1958, Ser. No. 746,360
11 Claims. (Cl. 313—108)

This invention relates to electroluminescent cells and, more particularly, to electroluminescent cells having very high efficiency and to methods for increasing the efficiency of electroluminescent light emission obtainable from electroluminescent phosphors.

The phenomenon of electroluminescence was first comprehensively disclosed by G. Destriau, one of his earlier publications being in London, Edinburgh and Dublin Philosophical Magazine, Series 7, vol. 38, No. 285, pages 700–737 (October 1947). One of the main drawbacks to the commercial use of electroluminescent devices as light sources is their relatively poor efficiency in converting electrical energy to light. The best efficiencies as are normally obtainable with electroluminescent cells are considerably less than are obtainable with the usual incandescent light source, which normally displays an efficiency of from 14 to 16 lumens per watt.

It is the general object of this invention to avoid and overcome the foregoing and other difficulties of and objections to prior-art practices by the provision of an electroluminescent cell having increased efficiency.

It is another object to provide a method for increasing the efficiency of electroluminescent light emission obtainable from finely-divided electroluminescent phosphor.

It is a further object to provide specific methods for increasing the efficiency of electroluminescent light emission obtainable from electroluminescent phosphors.

It is an additional object to provide preferred and optimum conditions for processing electroluminescent phosphors in order to obtain best efficiencies.

The aforesaid objects of the invention, and other objects which will become apparent as the description proceeds, are achieved by providing a method for increasing the efficiency of electroluminescent light emission obtainable from prepared, finely-divided electroluminescent phosphor, whereby there are obtained from the phosphor for later incorporation into dielectric medium, finely-divided phosphor particles having an average particle diameter of less than about 65% of the average particle diameter of the phosphor as initially prepared. These fine phosphor particles are then admixed with dielectric medium for use in an electroluminescent cell having increased efficiency, with at least a substantial portion of the phosphor particles insulated from one another by the admixed dielectric medium. There are also provided specific methods for obtaining the phosphor particles having smaller average particle diameters.

For a better understanding of the invention, reference should be had to the accompanying drawings wherein:

FIG. 1 is a cross-sectional view of an electroluminescent cell incorporating very finely-divided phosphor particles, which cause the cell to display enhanced efficiency;

FIG. 2 is a plan view of an alternative electroluminescent cell construction incorporating very finely-divided electroluminescent phosphors in order that the cell will display enhanced efficiency;

FIG. 3 is a flow chart illustrating the present method;

FIG. 4 is a graph of efficiency versus cell voltage representing the luminous efficiency of electroluminescence for phosphor samples having different average particle diameters but otherwise similar;

FIG. 5 is a graph similar to FIG. 4, except that the efficiency readings were taken at an excitation frequency different from that used in taking the curves in FIG. 4;

Figure 6:
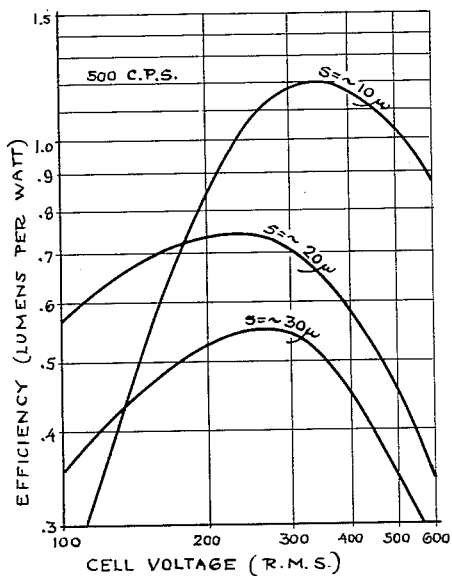
Figure 7:
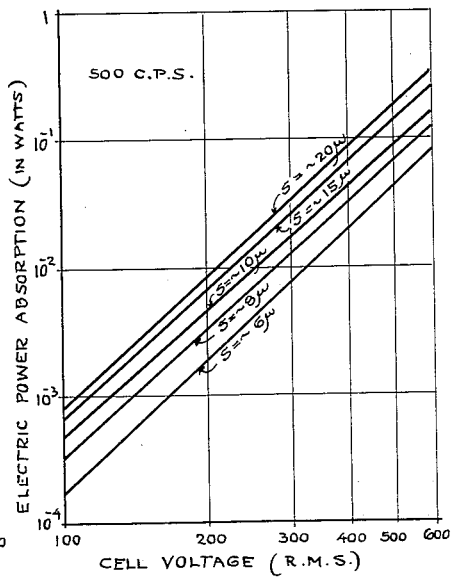
Figure 8:
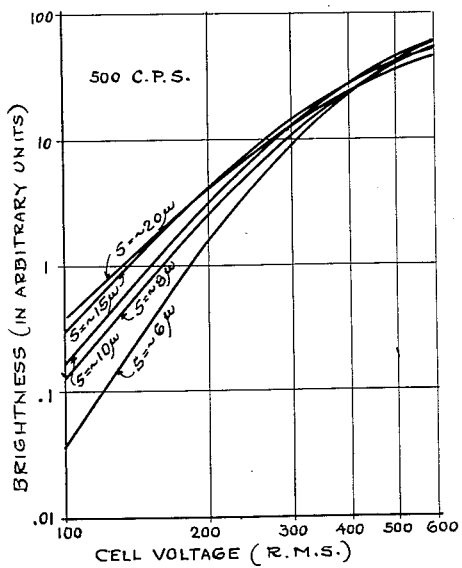

FIG. 6 corresponds to FIG. 4 except that different phosphor was used in taking the presented curves;

FIG. 7 is a graph of electric power absorption versus cell voltage, illustrating the power absorption for the varying phosphor particle sizes as used in taking the curves shown in FIG. 4;

FIG. 8 is a graph of brightness in arbitrary units versus cell voltage, illustrating the electroluminescent brightness for the different phosphor samples as used in taking the curves in FIG. 4.

With specific reference to the form of the invention illustrated in the drawings, in FIG. 1 is illustrated an electroluminescent cell 10 which generally comprises a light-transmitting foundation 12 having coated thereover a light-transmitting first electrode 14. Over the first electrode 14 is coated a layer 16 comprising finely-divided electrolminescent phosphor embedded in a dielectric medium. This phosphor has been processed, before incorporation into the dielectric medium, in the manner as described hereinafter. Over the phosphor-dielectric layer is a second electrode 18. Electrical lead conductors 20 electrically connect to the electrodes 14 and 18 and are adapted to be connected across the source of electrical potential (not shown). As a specific example, the light-transmitting foundation 12 can comprise any suitable glass and the first electrode 14 can be formed of tin oxide or other metallic oxide such as indium oxide for example, as is usual in electroluminescent cell constructions. The dielectric material into which the phosphor is embedded can comprise any light-transmitting dielectric material and polyvinyl-chloride acetate is preferred, although other dielectrics such as polystyrene can be substituted if desired. The second electrode 18 preferably comprises a vacuum-metallized layer of aluminum or silver, for example. If desired, both of the electrodes could be made light-transmitting, such as by sandwiching a layer of phosphor and dielectric between two tin-oxide-coated glass foundations. The thickness of the phosphor-dielectric layer 16 can be varied and as an example is two mils. The purpose of the dielectric material with which the phosphor is admixed is to insulate at least a substantial portion of the finely-divided phosphor particles from one another and to inhibit any tendency for electrical breakdown across the cell electrodes. To achieve this, the ratio by volume of phosphor to dielectric should be less than about 1.5:1. As an example, 0.5 part by volume of phosphor to one part by volume dielectric can be used.

In the embodiment shown in FIG. 2, the electrodes 22 are formed as a grid-mesh. Such electrodes can readily be formed by printed-circuitry techniques onto a plastic or other non-conducting foundation 24. As a specific example, the spacing between adjacent wires comprising the grid-mesh electrodes is 2 mils. Over the grid-mesh electrodes 22 is sprayed a layer 26 of phosphor-dielectric. Both of the foregoing constructions as shown in FIGS. 1 and 2 are generally well known in the electroluminescent art and various combinations of grid-mesh-type and continuous-type electrodes can be utilized, as is well known. Each of the cells as illustrated essentially comprises spaced electrodes with material between the spaced electrodes comprising finely-divided electroluminescent phosphor embedded in dielectric medium and the embedded phosphor has been specially processed as explained in detail hereinafter.

Before processing the phosphor in accordance with the present invention, the electroluminescent phosphor is first prepared in a conventional manner. As a specific example, a green-emitting electroluminescent phosphor comprising zinc sulfide activated by copper and coactivated by chlorine can be prepared by admixing 1000 grams of zinc sulfide with 30 grams sulphur, 12.8 grams copper acetate and 4.5 grams ammonium chloride. This admixture is fired in a partially-closed container in a nitrogen atmosphere at a temperature of about 950° C. for about 100 minutes. Thereafter the fired phosphor is slightly crushed, 3 grams of sulphur are added to the phosphor and it is refired in a similar manner. Thereafter, the refired phosphor is again slightly crushed. The crushed phosphor is then desirably washed in a solution which is a solvent for cuprous sulfide, but which is not a solvent for zinc sulfide, examples being a one-molar solution of sodium, potassium or ammonium cyanide. The washed phosphor is dried and desirably sieved through a 400-mesh sieve for example, in order to remove any overly-large particles. The foregoing procedure will produce an excellent finely-divided, green-emitting electroluminescent phosphor having an average or mean particle diameter of about 12 microns, although the finely-divided particles which comprise the phosphor will vary in diameter over a wide range.

In accordance with the present invention and as shown in the flow chart in FIG. 3, there are obtained from the prepared phosphor, for later incorporation into dielectric medium, finely-divided phosphor particles having an average particle diameter of less than about 65% of the average particle diameter of the phosphor as initially prepared. Those phosphor particles having the desired average size are readily obtained by means of a liquid-settling technique. As a specific example, 20 grams of the phosphor as specified hereinbefore are suspended in a settling tank with three liters of room temperature ethanol, the settling tank having a column height of fifty centimeters. The phosphor and ethanol are thoroughly stirred so as to suspend the phosphor in the ethanol in a substantially uniform manner. For the foregoing specific phosphor, in approximately 10 minutes substantially all phosphor particles having a diameter of 20 microns and greater will have settled from the suspension to the bottom of the settling tank. The supernatant ethanol and phosphor which remains suspended therein is decanted and the phosphor remaining suspended is separated from the ethanol. The previously-settled phosphor is collected, resuspended in the ethanol and allowed to settle again. The resettled phosphor is then collected as before and the foregoing procedure is desirably repeated several times such as three or four times for example, in order to insure that the large phosphor particles have not carried with them appreciable amounts of the smaller phosphor particles. After the ten minute fraction is removed as per the foregoing procedure, the supernatant liquid and all the smaller remaining phosphor particles are again placed in suspension in the settling tank and allowed to settle for a period of 25 minutes. The supernatant ethanol and phosphor are then decanted, the settled phosphor and phosphor remaining suspended are separated from one another and the 25 minute settling procedure desirably repeated several times. This will separate from the phosphor a fraction having an average particle diameter of 15 microns. The foregoing procedures are again repeated, but using a settling period of 50 minutes in order to separate a phosphor fraction having an average particle diameter of 10 microns. Further settling periods of 80 minutes and 2 hours, conducted as before, will produce phosphors having an average particle diameter of 8 microns and 6 microns respectively. While alcohol has been used as the suspending medium, other materials such as water can be used equally well, but it is desirable to use alcohol since this minimizes the problems of drying the phosphor. If desired the foregoing phosphor fractions, after separation, can be rewashed in the solution which is a solvent for cuprous sulfide, but which is not a solvent for zinc sulfide.

As a second specific example, a yellow-emitting zinc sulfide electroluminescent phosphor which is activated by copper and manganese and coactivated by chlorine can be prepared by admixing 1000 grams of zinc sulfide with 20 grams of sulphur, 9.5 grams copper acetate, 0.70 gram ammonium chloride and 40 grams manganese carbonate. The foregoing raw mix is fired in a partially-closed container in a nitrogen atmosphere at a temperature of about 1100° C. for about 2 hours. For optimum output, the phosphor is desirably lightly crushed, 5 grams of additional sulphur added and then refired in a similar manner. After refiring, the phosphor is desirably crushed and washed with the solution which is a solvent for cuprous sulfide, but which is not a solvent for zinc sulfide, as specified hereinbefore for the previous example. Thereafter the washed phosphor is dried and desirably sieved as before. Such a phosphor will have an average particle diameter of approximately 20 microns and the phosphor can be separated into various fractions, such as a 30-micron average particle diameter fraction, a 20-micron average particle diameter fraction and a 10-micron average particle diameter fraction. The settling times for separating the foregoing fractions are 5 minutes for the 30-micron fraction, 10 minutes for the 20-micron fraction and 50 minutes for the 10-micron fraction, with the settling techniques the same as specified for the previous example. In either of the foregoing examples, each phosphor fraction will carry through some limited amounts of both larger and smaller phosphor particles, but the average diameter of the phosphor particles in the fractions will be as specified. The most accurate method of determining average particle size has been found to be a microscopic technique, which when averaged over a large number of phosphor particles is quite accurate.

While the foregoing specific examples are carried through in detail for two specific phosphors, the present invention is equally applicable to any prepared electroluminescent phosphor, such as a blue-emitting zinc sulfide activated by copper, a blue-green zinc sulfide activated by copper and coactivated by chlorine, a yellow-emitting zinc sulfo-selenide activated by copper and coactivated by chlorine and a blue-green emitting zinc sulfide activated by copper and lead. Further details for initial preparation of some of these additional phosphors can be found in copending application Ser. No. 732,510, filed May 2, 1958 and owned by the present assignee. All of the foregoing phosphors are generally well known and cover a wide range of electroluminescent phosphors.

In testing the efficiencies of the foregoing phosphors, each fraction was incorporated into a test cell using a dielectric of castor oil. The thickness of the phosphor and castor oil film was 80 microns and 2 parts by weight of phosphor to 1 part by weight of oil was used. In addition, a twelve-micron-thick film of polyethylene terephthalate was also included between the cell electrodes. Other than this, the construction of the test cells was usual in that one electrode was aluminum and the other electrode was conducting glass. In FIG. 4 are shown curves of efficiency in lumens per watt versus cell R.M.S. voltage at 500 cycles for the five fractions of the green-emitting, electroluminescent zinc sulfide phosphor described hereinbefore. In FIGS. 4 through 8 the average phosphor particle sizes are indicated on the curves shown therein. As illustrated in FIG. 4, the emission intensity of very small or fine particles increases faster with increasing voltage than the emission intensity of the relative large or coarse particles. At the lower cell excitation voltages, the efficiency of the smaller particles is not as great as the efficiency of the large particles, but as the excitation voltage is increased to intermediate and higher values, the steeper curve of efficiency versus voltage causes the smaller particles to have a maximum efficiency which is considerably greater than that which is realized from the larger particles. The maximum efficiency which was realized in the test cell was about 14 lumens per watt which compares favorably to a 60 watt incandescent lamp. The efficiency of the phosphor particles per se, discounting the losses encountered in the cell, was about 18 to 19 lumens per watt. It has been reported previously that the best efficiency which could be realized from electroluminescence, as based on theoretical considerations, is about 14 lumens per watt. Even this reported theoretical maximum efficiency of 14 lumens per watt had never been achieved.

The increased efficiency for the smaller particle sizes is independent of excitation frequency and in FIG. 5 are shown curves taken from the same phosphor fractions used in taking the curves shown in FIG. 4, except that the excitation frequency was 60 cycles per second rather than 500 cycles per second. The maximum efficiency is decreased slightly, but otherwise, the general shape of the curves is quite similar.

In FIG. 6 are shown curves similar to those illustrated in FIGS. 4 and 5 except the foregoing yellow-emitting, zinc sulfide phosphor activated by copper and manganese and coactivated by cholorine was used in taking the data represented by the curves. For this phosphor, the 10-micron fraction displayed an efficiency about twice as great as the efficiency of the original phosphor.

The increase in efficiency appears independent of the amount of phosphor material which is used in the cell, provided the amount of phosphor material as used is not so great as to create any excessive undue power loss in the cell, any excessive optical reabsorption by the phosphor, or any tendency for electrical breakdown across the cell electrodes. In some photoluminescent phosphors, such as are used in fluorescent lamps, an increased efficiency is realized from smaller particle sizes, where considerably less phosphor is used than the amount required for best output. Where the optimum amounts of phosphor are used for best brightness for such fluorescent lamps, however, the larger phosphor particle sizes have the greatest efficiency in converting ultraviolet radiations to visible radiations. In the present case the effect is just the opposite. In addition, where photoluminescent phosphors are concerned, an increase in efficiency in the phosphor is indicative that the brightness of the lamp or device incorporating the phosphor will be increased correspondingly. In electroluminescent cells, this has not been observed, at least to any marked degree. The explanation for the substantial uniformity of brightness at intermediate and higher voltages for the electroluminescent phosphor particles, whatever their particle size, is found in the curves shown in FIGS. 7 and 8. In FIG. 7 are plotted curves of electric power absorption, expressed in watts, versus cells R.M.S. excitation volts for the phosphor fractions, the efficiency performance of which are plotted as the curves shown in FIG. 4. As shown in FIG. 7, the smaller the particle size, the less the power absorption in these particles. In FIG. 8 are shown curves of brightness in arbitrary units versus cell R.M.S. volts for the same phosphor fractions as were used in taking the curves shown in FIGS. 4 and 7. At very low excitation voltages, the actual brightness for the smaller particle sizes are correspondingly decreased as compared to the brightnesses realized with the large phosphor particles, but at intermediate and higher voltages, the brightnesses observed with all of the phosphor fractions are approximately the same. Since electroluminescent cells are normally operated with as high a voltage as is practical with regard to the cell constructions, the cells in commercial use will normally be operated toward the righthand portions of the curves as shown in FIG. 8. In these portions of the curves, the efficiencies of the cells incorporating the smaller phosphor fractions will be greatly increased over the usual electroluminescent phosphors which include substantial amounts of larger particles.

It is possible initially to process finely-divided electroluminescent phosphors without resorting to any liquid-settling or other such technique so that the finely-divided particles comprising the phosphor have relatively small average particles diameters. To date, however, such processing normally results in a phosphor which has comparatively poor performance. Apparently the phosphor firing and other preparation procedures which are required for best performance inherently result in producing a phosphor having an average particle size which is considerably greater than that required for best efficiency. Further, the advantages to be gained from proper firing and other preparation conditions are greater than the advantages to be gained from obtaining selective particle size solely by varying the initial phosphor preparation conditions. In addition, the processing procedures which are utilized to produce different electroluminescent phosphors for best performance characteristics result in producing different average particle sizes for the different finely-divided phosphors. As an example, the yellow-emitting zinc sulfide electroluminescent phosphor as used in taking the curves shown in FIG. 6 displayed, before any particle isolation, an average particle diameter of about 20 microns. whereas the green-emitting zinc sulfide electroluminescent phosphor as used in taking the curves shown in FIG. 4 displayed, before any particle isolation, an average particle diameter of about 12 microns. For both of these phosphors, those phosphor particles having an average particle diameter of less than about 65% of the initial average phosphor particle diameter displayed a greatly-increased efficiency.

In order to obtain best increases in efficiency, it is desirable that the average particle diameter of the isolated phosphor should be from about 1 to about 7 microns and for optimum efficiency, the average particle size of the isolated phosphor should be from about 2 to about 5 microns. Phosphor particles having a diameter greater than about 7 microns absorb considerable electrical power without contributing to light emission in an equivalent amount. Phosphors having an average particle diameter below 1 microns have two drawbacks in that overly-fine particles have a large surface area and an equivalent tendency for parasitic power absorption due to surface moisture and in addition, overy-fine phosphor particles require excessive field strengths in order to realize maximum efficiency. In explanation, reference is made to FIG. 4 wherein it is shown that the smaller the average particle size, the further to the right is shifted the peak of efficiency. As a practical matter, the field strengths which can be utilized should be below about 100 kv./cm., at least according to present techniques.

Phosphor particles having an average particle diameter of less than about 65% of the average particle diameter of the phosphor as originally prepared can be obtained by procedures other than the foregoing liquid-settling technique. For example, any of the foregoing electroluminescent phosphors can be etched in a strong acid in order to dissolve an appreciable portion of the phosphor particles in order to reduce their particle size. As a specific example, either of the foregoing green-emitting or yellow-emitting zinc sulfide phosphors activated by copper or by copper and manganese can be etched in concentrated hydrochloric acid at room temperature. In the case of the foregoing green-emitting, copper-activated and chlorine-coactivated zinc sulfide phosphor, the original phosphor had an average particle diameter of about 12 microns, as noted. After two minutes of etching in concentrated hydrochloric acid, the average particle diameter is reduced to approximately 10 microns. After five minutes etching the average diameter of the phosphor particles is reduced to 9 microns and after fifteen minutes etching, the average diameter of the phosphor particles is reduced to 7 microns. Further etching will reduce the average particle diameter still further. After etching, the phosphor is rinsed in water for example to remove any residual traces of the acid. Acids other than concentrated hydrochloric acid can be used, such as hydrofluoric acid or sulphuric acid, used in equivalent strength. In addition, any substance which is a solvent for zinc sulfide can be used with equivalent results, such additional solvents being water heated to a temperature approaching its critical temperature, or molten sodium or potassium sulfide. Additional methods for obtaining the phosphor particles having the desired average particle sizes are also usable, such as a gas-separation technique or a centrifugal-separation process, for example.

The foregoing liquid-settling and dissolution techniques for obtaining phosphor particles having desired average particle size can also be combined with beneficial effects. For example, the largest and the smallest diameter phosphor fractions, such as the ten-minute and two-hour fractions for the first example given herein, can first be removed by a liquid-settling technique to obtain a phosphor having an average particle diameter of 12 microns for example. While this will not alter the average particle diameter, it will provide for better uniformity of particle size in the final phosphor. Thereafter the residual phosphor can be dissolved in a solvent such as specified hereinbefore for a sufficient time in order to achieve the desired particle size. Solvent-dissolution of the phosphor is more rapid than a liquid-setting technique. By first removing the extremes in particle sizes by the liquid-settling technique and thereafter using a solvent-dissolution procedure, the resulting diameters of the phosphor particles are quite uniform and the procedures used for obtaining the desired average particle sizes are expedited considerably.

After the phosphor having the desired average particle size is obtained by any of the foregoing procedures, the desired phosphor particles are incorporated into a dielectric medium for use in an electroluminescent cell. As an example, one part by volume of the finely-divided phosphor can be admixed with two parts by volume of polyvinyl-chloride acetate and sprayed onto the tin-oxide-coated glass such as shown in FIG. 1, or sprayed onto the grid-mesh-type electrodes such as shown in FIG. 2. Thereafter the electroluminescent cells are completed in accordance with the usual techniques.

It is important that the phosphor particles having the desired average particle size be obtained from the initially-prepared phosphor before any of the phosphor is incorporated into the dielectric medium for use in electroluminescent cells. Only in such a manner can any degree of control be maintained between the average particle size of the phosphor and the relative amounts of phosphor and dielectric. While the ratio of parts by volume of phosphor to dielectric is not critical and can vary over a wide range, there should not be such large amounts of phosphor wtih respect to the dielectric as might tend to form continuous phosphor paths from electrode to electrode or even between individual phosphor particles, in other words, substantially all of the phosphor particles which are incorporated into the dielectric should be electrically insulated from one another by the dielectric. This is important from the standpoint of best efficiency for when any appreciable number of phosphor particles contact one another, an excessive power loss will result. As a practical matter, the ratio of parts by volume of phosphor to parts by volume of dielectric should be less than about 1.5:1 to insure that the admixed dielectric material, when applied with the phosphor to a foundation by flowing or spraying for example, will substantially electrically insulate the admixed phosphor particles from one another. Of course, the ratio of parts by volume of phosphor to parts by volume of dielectric can be made as small as desired, depending on the intended use for the electroluminescent cell. The volume occupied by the phosphor can be determined by dividing weight by true density.

It is possible to obtain an isolation of phosphor particle sizes at the time the phosphor is incorporated into the dielectric, such as by brushing a phosphor across a dielectric material as it is slowly heated. This will result in forming a plurality of substantially uniform layers of finely-divided phosphor particles, but as adjacent layers of phosphor particles are deposited, an appreciable portion of the phosphor particles in the adjacent layers will be in contacting relationship with the phosphor particles in the previously-formed layer, thereby creating undue power loss in the finished cell.

It will be recognized that the objects of this invention have been achieving by providing an electroluminescent cell having increased efficiency and by providing a method for increasing the efficiency of electroluminescent light emission obtainable from finely-divided electroluminescent phosphor. In addition, there have been provided specific methods for increasing the efficiency of electroluminescent phosphors as well as preferred and optimum conditions for processing electroluminescent phosphors in order to obtain best efficiencies.

While best embodiments of this invention have been illustrated and described in detail, it is to be particularly understood that the invention is not limited thereto or thereby.

I claim:

1. The method of increasing the efficiency of electroluminescent light emission obtainable from activated zinc sulfide electroluminescent phosphor comprising finely-divided phosphor particles having a wide range of particle sizes, which method comprises obtaining from said phosphor for later incorporation into dielectric medium, finely-divided phosphor particles having an average particle diameter of from about 1 to about 7 microns and less than about 65% of the initial average phosphor particle diameter.

2. The method of increasing the efficiency of electroluminescent light emission obtainable from zinc sulfide electroluminescent phosphor activated by metal including copper and comprising finely-divided phosphor particles having a wide range of particles sizes, which method comprises obtaining from said phosphor for later incorporation into dielectric medium, finely-divided phosphor particles having an average particle diameter of from about 1 to about 7 microns and less than about 65% of the initial average phosphor particle diameter.

3. The method of increasing the efficiency of electroluminescent light emission obtainable from copper-activated zinc sulfide electroluminescent phosphor comprising finely-divided phosphor particles having a wide range of particle sizes, which method comprises obtaining from said phosphor for later incorporation into dielectric medium, finely-divided phosphor particles having an average particle diameter of from about 2 to about 5 microns and less than about 65% of the initial average phosphor particle diameter.

4. The method of increasing the efficiency of electroluminescent light emission obtainable from finely-divided particles of electroluminescent phosphor comprising activated zinc sulfide, which method comprises contacting said finely-divided phosphor particles with a solvent therefor, allowing said solvent to dissolve outer surfaces of said finely-divided particles to reduce by more than about 35% the average diameter of said particles, and separating undissolved phosphor particles from solvent and phosphor dissolved therein.

5. The method of increasing the efficiency of electroluminescent light emission obtainable from finely-divided activated zinc sulfide electroluminescent phosphor particles, which method comprises contacting said finely-divided phosphor particles with a solvent therefor, allowing said solvent to dissolve outer surfaces of said finely-divided particles to reduce by more than about 35% the average diameter of said particles and to an average particle diameter of from about 1 to about 7 microns, and separating undissolved phosphor particles from solvent and phosphor dissolved therein.

6. The method of increasing the efficiency of electroluminescent light emission obtainable from finely-divided activated zinc sulfide electroluminescent phosphor particles, which method comprises contacting said finely-divided phosphor particles with a strong acid, allowing said acid to dissolve outer surfaces of said finely-divided particles to reduce by more than about 35% the average diameter of said particles and to an average particle diameter of from about 1 to about 7 microns, and separating undissolved phosphor particles from said acid and phosphor dissolved therein.

7. The method of increasing the efficiency of electroluminescent light emission obtainable from finely-divided activated zinc sulfide electroluminescent phosphor particles, which method comprises contacting said finely-divided phosphor particles with strong hydrochloric acid, allowing said acid to dissolve outer surfaces of said finely-divided particles to reduce by more than about 35% the average diameter of said particles and to an average particle diameter of from about 2 to about 5 microns, and separating undissolved phopshor particles from said acid and phosphor dissolved therein.

8. The method of increasing the efficiency of electroluminescent light emission obtainable from electroluminescent phosphor comprising finely-divided activated zinc sulfide phosphor particles having a wide range of particle sizes, which method comprises separating from the particles comprising said finely-divided phosphor, phosphor particles of selective sizes, contacting said separated selective-size phosphor particles with a solvent for said phosphor particles, allowing said solvent to dissolve outer surfaces of said contacted phosphor particles to reduce by more than about 35% the average diameter of said contacted particles, and separating residual undissolved phosphor from said solvent and phosphor dissolved therein.

9. An electroluminescent cell comprising, spaced electrodes, material between said electrodes comprising finely-divided activated zinc sulfide electroluminescent phosphor embedded in dielectric medium, said embedded phosphor having been processed from prepared electroluminescent phosphor by the method comprising: obtaining from said phosphor for later incorporation into dielectric medium, finely-divided phosphor particles having an average particle diameter of from about 1 to about 7 microns and less less than about 65% of the initial average phosphor particle diameter; and thereafter embedding said obtained phosphor particles in dielectric medium so that substantially all of the particles comprising said obtained phosphor are electrically insulated from one another.

10. An electroluminescent cell comprising, spaced electrodes, material between said electrodes comprising finely-divided copper-activated zinc sulfide electroluminescent phosphor embedded in dielectric medium, said embedded phosphor having been processed from prepared electroluminescent phosphor by the method comprising: obtaining from said phosphor for later incorporation into dielectric medium, finely-divided phosphor particles having an average particle diameter of from about 1 to about 7 microns and less than about 65% of the initial average phosphor particle diameter; and thereafter embedding said obtained phosphor particles in dielectric medium so that substantially all of the particles comprising said obtained phosphor are electrically insulated from one another with the ratio by volume of phosphor to dielectric being less than about 1.5:1.

11. An electroluminescent cell comprising, spaced electrodes, material between said electrodes comprising finely-divided copper-activated zinc sulfide electroluminescent phosphor embedded in dielectric medium, said embedded phosphor having been processed from prepared electroluminescent phosphor by the method comprising: obtaining from said phosphor for later incorporation into dielectric medium, finely-divided phosphor particles having an average particle diameter of from about 2 to about 5 microns and less than about 65% of the initial average phosphor particle diameter; and thereafter embedding said obtained phosphor particles in dielectric medium so that substantially all of the particles comprising said obtained phosphor are electrically insulated from one another with the ratio by volume of phosphor to dielectric being less than about 1.5:1.

References Cited in the file of this patent

UNITED STATES PATENTS

| | | |
|---|---|---|
| 2,579,900 | Butler | Dec. 25, 1951 |
| 2,743,237 | Froelich | Apr. 24, 1956 |
| 2,755,254 | Butler | July 17, 1956 |
| 2,821,509 | Hunt et al. | Jan. 28, 1958 |
| 2,841,730 | Piper | July 1, 1958 |
| 2,847,386 | Mazo et al. | Aug. 12, 1958 |
| 2,857,541 | Etzel et al. | Oct. 21, 1958 |
| 2,894,854 | MacIntyre et al. | July 14, 1959 |

OTHER REFERENCES

Leverenz: U.S. Publication Board, page 192, Report No. 25,481 (1945).